United States Patent
Blaha

(10) Patent No.: US 7,339,997 B2
(45) Date of Patent: Mar. 4, 2008

(54) LINE DRIVER AND METHOD OF OPERATING THE SAME

(75) Inventor: Matthew S. Blaha, Holmdel, NJ (US)

(73) Assignee: Agere Systems Inc., Allentown, PA (US)

(*) Notice: Subject to any disclaimer, the term of this patent is extended or adjusted under 35 U.S.C. 154(b) by 601 days.

(21) Appl. No.: 09/803,593

(22) Filed: Mar. 9, 2001

(65) Prior Publication Data

US 2002/0141492 A1 Oct. 3, 2002

(51) Int. Cl.
*H04B 3/00* (2006.01)
*H03F 1/14* (2006.01)
*H03F 3/04* (2006.01)

(52) U.S. Cl. .................. 375/257; 330/51; 330/297
(58) Field of Classification Search ............... 375/297, 375/247, 257, 258; 330/51, 10, 251, 297; 327/108, 405; 326/78; 455/307
See application file for complete search history.

(56) References Cited

U.S. PATENT DOCUMENTS

| | | | | |
|---|---|---|---|---|
| 3,755,693 A * | 8/1973 | Lee | | 326/78 |
| 3,961,280 A | 6/1976 | Sampei | | 330/40 |
| 4,348,644 A * | 9/1982 | Kamiya | | 330/297 |
| 4,706,039 A * | 11/1987 | Dijkmans et al. | | 330/297 |
| 5,027,003 A | 6/1991 | Haight et al. | | 327/405 |
| 5,387,876 A * | 2/1995 | Sondermeyer | | 330/251 |
| 5,872,481 A * | 2/1999 | Sevic et al. | | 330/51 |
| 6,160,445 A * | 12/2000 | Schweighofer | | 330/10 |
| 6,204,730 B1* | 3/2001 | Servaes | | 330/251 |
| 6,320,913 B1* | 11/2001 | Nakayama | | 375/297 |
| 6,411,136 B1* | 6/2002 | Nianxiong et al. | | 327/108 |
| 6,567,491 B1* | 5/2003 | McCune et al. | | 375/247 |
| 2003/0008629 A1* | 1/2003 | Tegeler et al. | | 455/307 |

OTHER PUBLICATIONS

D.A. Johns, D.Essig; Integrated Circuits for Data Transmission over Twisted-Pair Channels; IEEE 1996 Custom Integrated Circuits Conference; pp. 2.1.1-2.1.8.*

H. Khorramabadi; A CMOS Line Driver with 80-dB Linearity for ISDN Applications; IEEE Journal of Solid State Circuits; vol. 27, No. 4; Apr. 1992; pp. 539-544.*

* cited by examiner

Primary Examiner—Don N. Vo

(57) ABSTRACT

A line driver coupled to a transmission path having line characteristics associated therewith and a method of operating the same. In one embodiment, the line driver includes a driver stage configured to send a signal along the transmission path. The line driver also includes a switching network, coupled to the driver stage, configured to adaptively select a power level to send the signal as a function of the line characteristics of the transmission path.

20 Claims, 3 Drawing Sheets

LINE DRIVER AND METHOD OF OPERATING THE SAME

TECHNICAL FIELD OF THE INVENTION

The present invention is directed, in general, to communication systems and, more specifically, to a line driver, method of operating the same and a transceiver employing the driver and method.

BACKGROUND OF THE INVENTION

In any electrical or electronic system, power considerations are generally a factor in circuit and system design, and line drivers, including Digital subscriber Line (DSL) drivers, are no exception. A driver typically includes an amplifier stage, having a gain (which may have a value greater than, equal to or less than one), preceding an output stage in a transceiver. Line drivers are used, among other things, to drive or compel a signal (e.g., an analog signal) through a transmission medium. DSL drivers are used to drive signals down a transmission medium such as a twisted pair telephone wire. For a general discussion of DSL, please see "DSL: Simulation Techniques and Standards Development for Digital Subscriber Line Systems," by Dr. Walter Y. Chen, MacMillian Technical Publishing, 1998, which is hereby incorporated by reference in its entirety.

The power necessary to drive a signal down a transmission medium may vary depending on the line characteristics thereof. For example, given a plurality of telephone wires connected to a central office providing DSL service, each of the plurality of the twisted pair telephone wires generally exhibits different line characteristics thereby necessitating varying power prerequisites to transmit a signal. These needs may be a function of various related or disparate factors, such as a length of the transmission medium, electromagnetic shielding of the transmission medium, and so on.

Another design consideration that should be accommodated for is that the line driver should be designed with a sufficient amount of headroom. Headroom may be generally defined as a design parameter that allows a wider dynamic range associated with a driver's output than is normally associated with the typical root-mean-square average value of the driver's typical output signal.

This allocation of the dynamic range for the line driver may, therefore, accommodate for the transmission of certain bursts of signals with a significantly higher voltage amplitude when compared to the typical root-mean-square average of the signal. In other words, designing for the headroom of a signal may be necessary to accommodate a bursty output signal so that the driver is not forced into distortion.

However, designing for the desired headroom of a driver system, as well as compensating for various non-ideal characteristics of the transmission medium or path, may place even higher power considerations on the driver system. The inefficiencies associated with these considerations may necessitate that the voltage rails in connection with the amplifier stage of the line driver have a wider range, which in turn creates more extreme thermal characteristics, which may in turn lead to a lower density for the drivers than would otherwise be possible.

To combat these above and other considerations and inefficiencies, there have been attempts in the prior art to achieve more efficient amplifier or power driver systems. For instance, driver systems such as the AD8016, by Analog Devices, Incorporated of Norwood, Mass. and the LT1795 by Linear Technologies Corporation of Milpitas, Calif. allow for an adjustment of the bias current in the line driver to control quiescent consumption.

Another attempt to achieve a more efficient amplifier or driver system is disclosed in the U.S. Pat. No. 3,961,280, by Sampei, entitled "Amplifier Circuit Having Power Supply Voltage Responsive to Amplitude of Input Signal," issued on Jun. 1, 1976, which is hereby incorporated by reference in its entirety. In Sampei, a class of amplifiers, designated as class 'G' amplifiers, are disclosed. The amplifier disclosed by Sampei changes the power supply voltages in accordance with the magnitude of an input signal.

Problems persist, however, in association with these various systems and approaches. A limitation of the AD0816 and the LT1795 driver systems from Analog Devices, Incorporated and Linear Technologies Corporation, respectively, is that the devices only control the bias current. It does not control the dominant, dynamic power consumption of the driver. In the case of the amplifier disclosed by Sampei, which is associated with the class 'G' amplifiers, there are the problems of high circuit complexity, poor linearity and the need for multiple power supplies, each power supply correlating to given applied power level.

Accordingly, what is needed in the art is a line driver that may adaptively modify the power selection capability associated with transmitting a signal that overcomes the deficiencies in the prior art.

SUMMARY OF THE INVENTION

To address the above-discussed deficiencies of the prior art, the present invention provides a line driver coupled to a transmission path having line characteristics associated therewith and a method of operating the same. In one embodiment, the line driver includes a driver stage configured to send a signal along the transmission path. The line driver also includes a switching network, coupled to the driver stage, configured to adaptively select a power level to send the signal as a function of the line characteristics of the transmission path.

The present invention introduces, in one aspect, a line driver that adaptively selects a power level to send a signal as a function of the line characteristics of the transmission path. As a result, a power consumption level associated with transmitting signals can be specifically tailored to the environment in which the line driver is employed. In one embodiment, the driver stage includes a plurality of amplifiers configured to amplify the signal and a reference circuit configured to provide a reference level associated with the plurality of amplifiers. In an alternative embodiment, the switching network includes a plurality of switches configured to adaptively select the power level and a plurality of switches configured to couple an output of the line driver to ground. Additionally, the line driver may form a portion of a front end of a transceiver associated with a Digital Subscriber Line (DSL) system.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
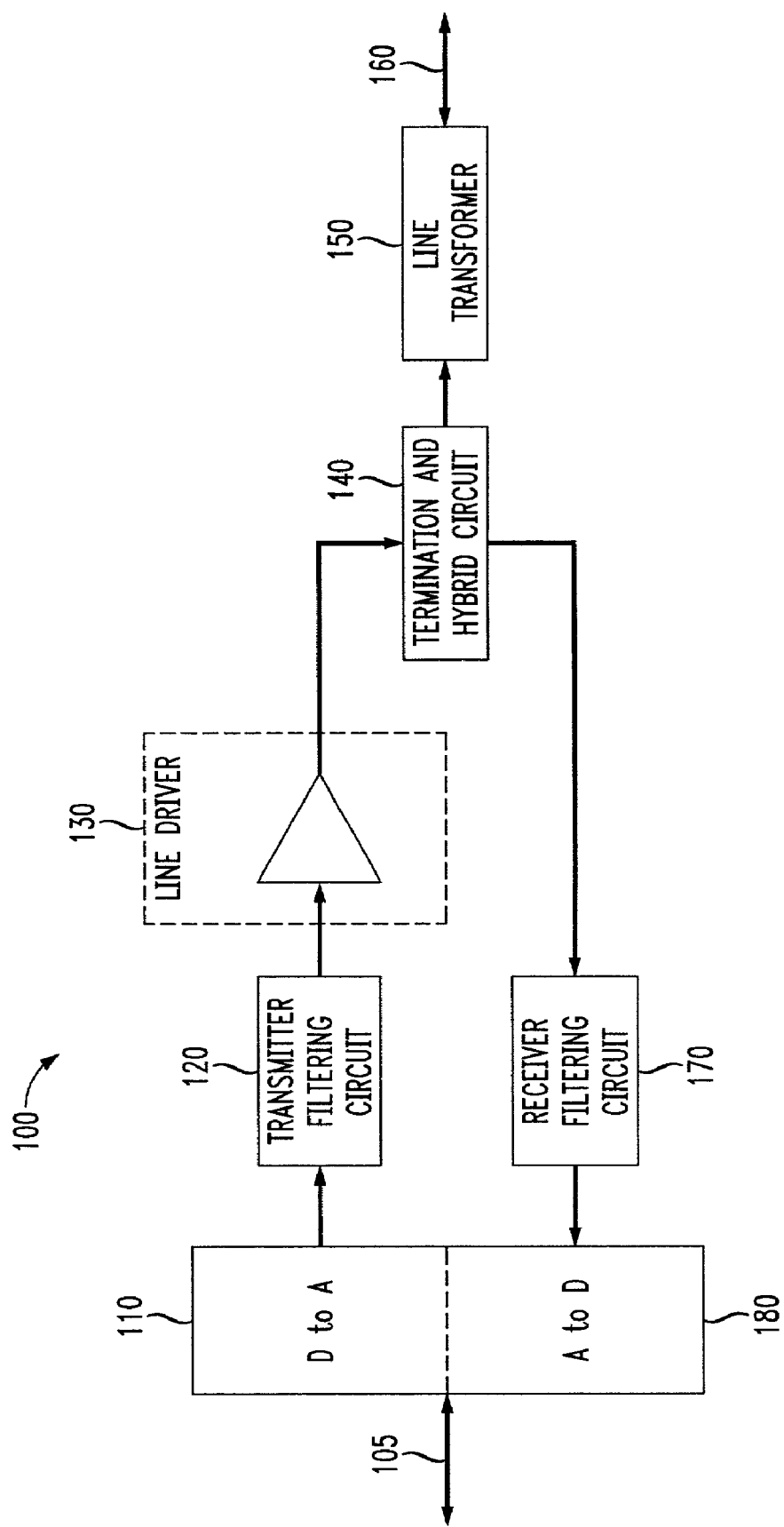
FIG. 1 illustrates a block diagram of an embodiment of a transceiver constructed according to the principles of the present invention.

Referring initially to FIG. 1, illustrated is a block diagram of an embodiment of a transceiver 100 constructed according to the principles of the present invention. The functionality and the various relationships between these various elements of the transceiver 100 will be detailed more fully below. In the illustrated embodiment, the transceiver 100 operates as a front end transmission system employing Digital Subscriber Line (DSL) service. Of course, the transceiver 100 may be employed in other communications networks as well.

The transceiver 100 includes a digital-to-analog converter 110, which converts an incoming digital signal to a corresponding analog signal. The digital signal is input into the digital-to-analog converter 110 through a bidirectional digital path 105. The transceiver 100 further includes a transmitter filtering circuit 120 coupled to the digital-to-analog converter 110. The analog signal from the digital-to-analog converter 110 undergoes appropriate signal processing functions including filtering processes.

The transceiver 100 further includes a line driver 130, which is coupled to the transmitter filtering circuit 120 and receives a signal therefrom. The line driver 130 is configured to, among other things, adaptively select a power level for driving an analog signal as a function of line characteristics or characteristics of a transmission path 160. The line driver 130 shall be described in greater detail below.

The transceiver 100 may further include a termination and hybrid circuit 140, which is coupled to the line driver 130. The termination and hybrid circuit 140 may perform such functions as maximizing the power transfer to a line transformer 150 and the transmission path 160. The termination and hybrid circuit 140 may also subtract the transmitter energy of the line driver 130 from a signal received by the transceiver 100, as the termination and hybrid circuit 140 may receive signals from either direction, transmitting or receiving, as shown in FIG. 1.

The transceiver 100 may further include a line transformer 150, which may be coupled to the termination and hybrid circuit 140. The line transformer 150 may be one of a variety of transformers known to those skilled in the art, such as an isolation transformer, a power transformer, etc. The line transformer 150 is further coupled to the transmission path 160. The line transformer 150 provides such functions as electrical isolation between the transmission path 160, such as a twisted pair telephone line, and transfers information from the termination and hybrid circuit 140 to the transmission path 160 or visa verses. The transmission path 160 may be able to carry signals in either direction, transmitting or receiving, as is evidenced in FIG. 1.

The transceiver 100 is also configured to receive an analog signal from the transmission path 160. The transceiver 100 further includes a receiver filtering circuit 170, and still further includes an analog-to-digital converter 180. The termination and hybrid circuit 140 is coupled to the receiver filtering circuit 170, the receiver filtering circuit 170 is coupled to the analog-to-digital converter 180, and the analog-and-digital converter 180 is coupled to the bidirectional digital path 105. The filtering by the receiver filtering circuit 170 is done in preparation for the analog-to-digital conversion performed by the analog-to-digital converter 180. The analog-to-digital converter 180 then converts the signal into digital form, and then this digital signal is output through the bidirectional digital path 105.

It should be understood that the representative transceiver 100 is submitted for illustrative purposes only and other transceiver configurations compatible with the principles of the present invention may be employed as the application dictates. Also, configurations and implementations of various elements (e.g., the transmitter filtering circuit 120) of the transceiver 100 are generally known in the art and as such detailed explanations were not heretofore submitted.

Figure 2:
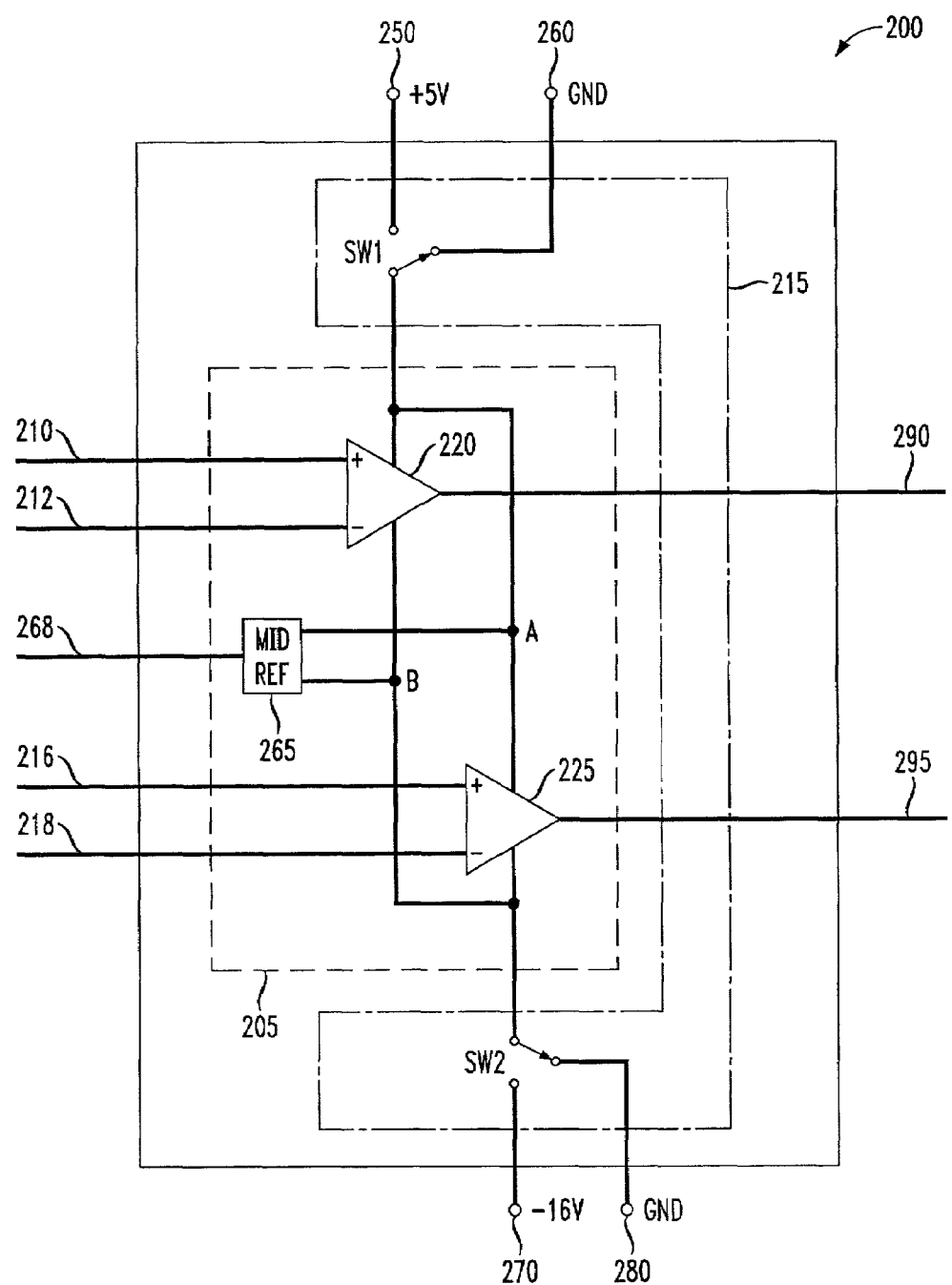
FIG. 2 illustrates a schematic diagram of an embodiment of a line driver constructed according to the principles of the present invention.

Turning now to FIG. 2, illustrated is a schematic diagram of an embodiment of a line driver 200 constructed according to the principles of the present invention. The line driver 200 includes a driver stage 205 which includes first and second amplifiers 220, 225 and a mid-level voltage reference circuit 265 coupled to first and second nodes A, B. The line driver 200 further includes a switching network 215 having a positive rail switch SW1 and a negative rail switch SW2.

A value corresponding to an analog signal is input into the driver stage 205 through a first signal differential line pair 210, 212. The first signal differential line pair 210, 212 is input into the first amplifier 220. Although using a line pair is preferable to deliver a less error-prone signal to a respective amplifier, a single signal line input into the respective amplifier is within the scope of the present invention. In an analogous manner, a second value also corresponding to an analog signal is input into the driver stage 205 through a second signal differential line pair 216, 218. The second signal differential line pair 216, 218 is input into the second amplifier 225. Again, although using a line pair is preferable to deliver a less error-prone signal to a respective amplifier, a single signal line input into the respective amplifier is within the scope of the present invention.

The mid-level voltage reference circuit 265 is configured to provide a voltage reference level 268 associated with the first and second amplifiers 220, 225. The voltage reference level 268 is provided to calculate a median voltage between the positive rail switch SW1 and the negative rail switch SW2 by measuring a voltage at the first and second nodes A, B. This median value may also be employed in a transceiver employing the line driver 200 to achieve a more balanced feedback loop with other components of the transceiver. Although use of a mid-level voltage reference circuit 265 is preferable, a mid-level voltage reference circuit 265 need not necessarily be used with the present invention.

The upper and lower voltage rails associated with the first and second amplifiers 220, 225 of the driver stage 205 are coupled to a switching network 215. As is well known by those skilled in the art, the voltage rails of an amplifier determine the upper and lower dynamic range of an output voltage thereof. An adaptive selection of an upper and lower voltage range for the first and second amplifiers 220, 225 leads to a more efficient driver stage 205 and therefore a more efficient line driver 200. This adaptive voltage selection, perhaps based upon such factors as detailed below, plays a role in accordance with the principles of the present invention.

The adaptive voltage selections of the present invention are based upon such factors as transmission path characteristics, which may in turn vary upon such factors as the length of the path, and the electromagnetic shielding of the path, etc. The adaptive voltage selections may also be a function of certain aspects of the signal itself, such as an allowance for the necessary headroom for a given signal, and so on.

The adaptive voltage selection is made in connection with the switching network 215 which in turn uses the positive rail switch SW1 and the negative rail switch SW2. Although first and second ground terminals 260, 280 will be described, the ground terminals 260, 280 will typically be connected to a common ground. The positive rail switch SW1 is couplable either to a +5 voltage source 250 or the first ground terminal 260, although the present invention is not limited to these values. The negative rail switch SW2 is couplable to a −16 voltage source 270 or the second ground terminal 280, although the present invention is certainly not limited to these values.

In other words, the switching network 215 adaptively selects, based upon certain criteria, either the +5 voltage source 250 or the first ground terminal 260 through the use of the positive rail switch SW1. The switching network 215 also adaptively selects a −16 voltage source 270 or the second ground terminal 280 through the use of the negative rail switch SW2. These are the positive and negative voltage rails which are applied across the first and second amplifiers 220, 225. The first and second amplifiers 220, 225 then output a dynamic power level through first and second driver outputs 290, 295, respectively.

The switching network 215 determines which of the following configurations is the advantageous, based upon such criteria as has been referenced above. For illustration, the switching network 215 may begin its adaptive selection with testing for a given response when the maximum voltage range selected, i.e. the positive rail switch SW1 is connected to the +5 voltage source 250, and the negative rail switch SW2 is connected to the −16 voltage source 260, for the greatest differential between the two applied rail voltages to the first and second amplifiers 220, 225. The switching network 215 then couples the positive rail switch SW1 with the first ground terminal 260, for an intermediate voltage differential between the two applied rail voltages to the first and second amplifiers 220, 225.

The switching network 215 then switches the positive rail switch SW1 from coupling to the first ground terminal 260 to the +5 voltage source 250, and switches the negative rail switch SW2 from coupling to the −16 voltage source 270 to the second ground terminal 280. This switching network 215 configuration creates the smallest voltage differential across the positive and negative rails of the first and second amplifiers 220, 225. The switching network 215 then determines, based perhaps upon the criteria disclosed above, a voltage rail differential that is to be applied across the first and second amplifiers 220, 225, and implements that advantageous differential. The switching network 215 can also periodically retest the line conditions after startup to determine an advantageous voltage rail differential, and again may implement that advantageous differential.

Figure 3:
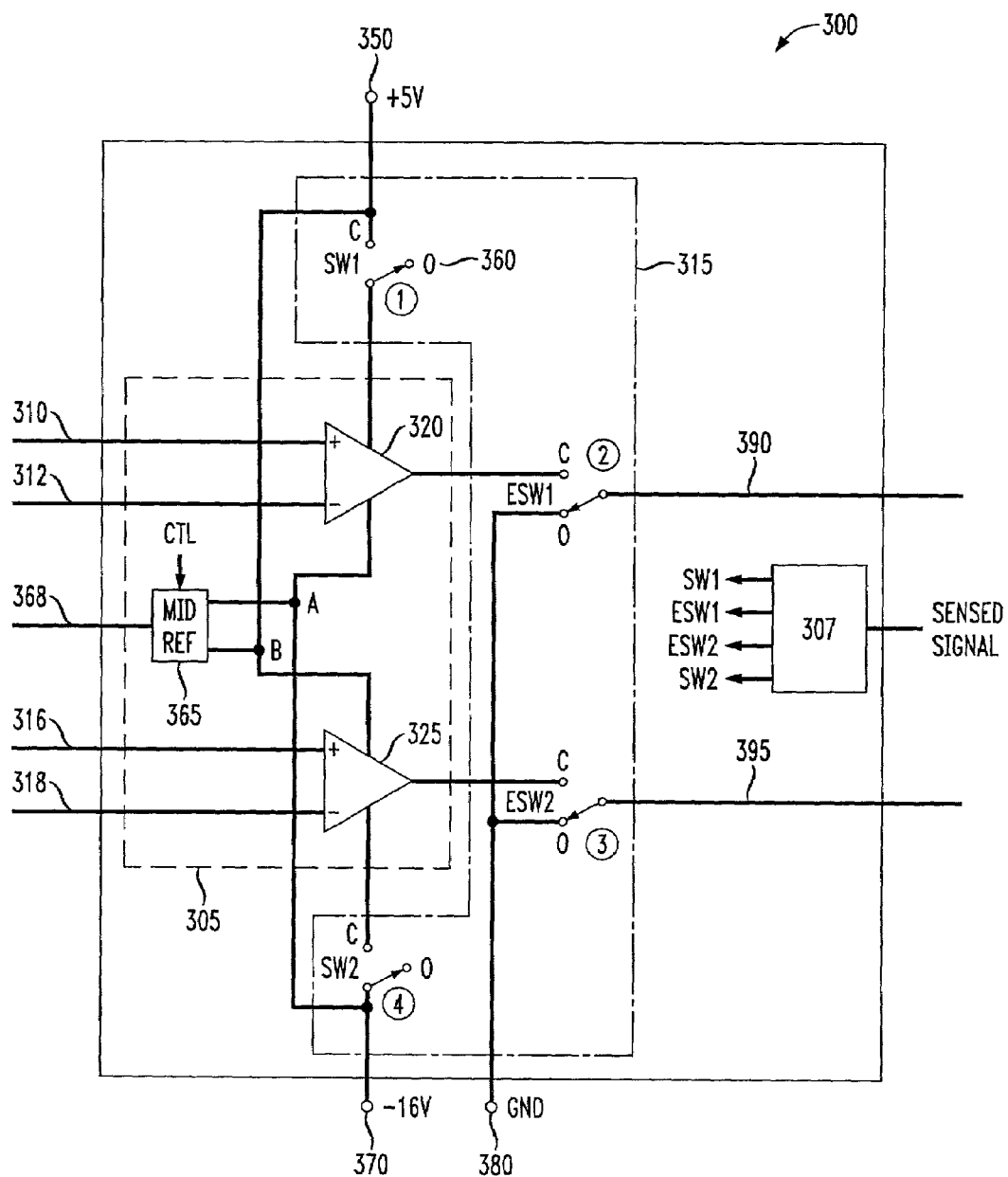
FIG. 3 illustrates a schematic diagram of another embodiment of a line driver constructed according to the principles of the present invention.

Turning now to FIG. 3, illustrated is a schematic diagram of another embodiment of a line driver 300 constructed according to the principles of the present invention. The line driver 300 includes a driver stage 305 which includes first and second amplifiers 320, 325, a mid-level voltage reference circuit 365 coupled to first and second nodes A, B. The line driver 300 further includes a switching network 315 having a positive rail switch SW1 and a negative rail switch SW2.

In an analogous manner as disclosed in FIG. 2, a value corresponding to an analog signal is input into the line driver 300 through a first signal differential line pair 310, 312. The first signal differential line pair 310, 312 is input into the first amplifier 320. Although using a line pair is preferable to deliver a less error-prone signal to a respective amplifier, a single signal line input into the respective amplifier is within the scope of the present invention. In an analogous manner, a second value also corresponding to the analog signal is input into the line driver 300 through a second signal differential line pair 316, 318. The second signal differential line pair 316, 318 is input into the second amplifier 325. Again, although using a line pair is preferable to deliver a less error-prone signal to a respective amplifier, a single signal line input into the respective amplifier is within the scope of the present invention.

The mid-level voltage reference circuit 365 is configured to provide a voltage reference level 368 associated with the first and second amplifiers 320, 325. The voltage reference level 368 is provided to calculate a median voltage between the positive rail switch SW1 and the negative rail switch SW2 through measuring a voltage at the first and second nodes A, B. This median value may also be employed in a transceiver employing the line driver 300 to achieve a more balanced feedback loop with other components of the transceiver. Although using a mid-level voltage reference circuit 365 is preferable, a mid-level voltage reference circuit 365 need not necessarily be used with the present invention.

The upper and lower voltage rails associated with the first and second amplifiers 320, 325 of the driver stage 305 are coupled to the switching network 315. As is well known by those skilled in the art, the voltage rails of an amplifier determine the upper and lower dynamic range of an output voltage thereof. An adaptive selection of an upper and lower voltage range for the first and second amplifiers 320, 325 leads to a more efficient driver stage 305 and therefore a more efficient line driver 300. This adaptive voltage selection, perhaps based upon such factors as detailed below, plays a role in accordance with the principles of the present invention. The adaptive voltage selections of the present invention are based upon such factors as discussed above.

Adaptive voltage selection is made in connection with the switching network 315, which in turn uses the positive rail switch SW1 and the negative rail switch SW2. Although first and second ground terminals 360, 380 will be described, the first and second ground terminals 360, 380 will typically be connected to a common ground. The positive rail switch SW1 is couplable either to a +5 voltage source 350 or the first ground terminal 360, although the present invention is certainly not limited to these values. The negative rail switch SW2 is couplable to a −16 voltage source 370 or a second ground terminal 380, although the present invention is certainly not limited to these values. The positive and negative voltage rails may then be applied across the first and second amplifiers 320, 325, which output a dynamic power level through first and second driver outputs 390, 395, respectively.

The switching network 315 is set to the configuration that is advantageous, based upon such criteria as has been referenced above. For example, the switching network 315 may begin its adaptive selection with testing for a given response when the maximum voltage range, an intermediate voltage differential between the two applied rail voltages and the smallest voltage differential across the positive and negative rails of the first and second amplifiers 320, 325 analogous to the procedure described with respect to FIG. 2. The switching network 315 then determines, based perhaps upon the criteria disclosed above, a voltage rail differential that is to be applied across the first and second amplifiers 320, 325, and implements that advantageous differential. The switching network 315 can also periodically retest the line conditions after startup to determine an advantageous voltage rail differential, and again may implement that advantageous differential.

The switching network 315 is coupled to a controller 307 and includes a first enablement switch ESW1 and a second enablement switch ESW2. The controller 307 determines whether to have either of the first and second driver outputs 390, 395 at ground voltage, perhaps based on the analog signal(s). After making this determination, the controller 307, through the use of the first enablement switch ESW1, either couples the output of the first amplifier 320 to the first line driver output 390, or instead couples the first line driver output 390 directly to the second ground terminal 380, as may be appropriate. In an analogous manner, the controller 307, through the use of the second enablement switch ESW2, either couples the output of the second amplifier 325 to the second line driver output 395, or instead couples the second line driver output 395 directly to the second ground terminal 380, as may be appropriate.

Coupling the second ground terminal 380 to the first and second line driver outputs 390, 395 of the line driver 300 (i.e. grounding the outputs) as manifested through the first and second enablement switches ESW1, ESW2 may in the present invention have a correlation with grounding of the positive and negative rail switches SW1, SW2. That is, whenever the first enablement switch ESW1 is coupled to the second ground terminal 380, the high voltage rails of the first and second amplifiers 320, 325 may be coupled to the first ground terminal 360. Likewise, whenever the second enablement switch ESW2 is coupled to the second ground terminal 380, the low voltage rails of the first and second amplifiers 320, 325 may be coupled to the second ground terminal 380. This relationship is set forth in the table below.

TABLE 1

OUTPUT VALUES FROM SWITCHING NETWORK

| Power Setting | SW1 | ESW1 | SW2 | ESW2 |
|---|---|---|---|---|
| High | C | C | C | C |
| Medium High | 0 | 0 | C | C |
| Medium Low | C | C | 0 | 0 |
| Off | 0 | 0 | 0 | 0 |

It should be understood, that the embodiments of the line driver employing the driver stage and switching network constructed according to the principles of the present invention illustrated and described with respect to the preceding FIGUREs are submitted for illustrative purposes only and other configurations compatible with the principles of the present invention may be employed as the application dictates. For a better understanding of communications theory, in general, and digital subscriber line services including the standards and systems that support the technology, see also "Understanding Digital Subscriber Line Technology" by Thomas Starr, Peter Silverman, and John M. Coiffi, Prentice Hall (1998), and "Digital Communication" by Edward A. Lee and David G. Messerschmitt, Kluwer Academic Publishers (1994), which are incorporated herein by reference.

Although the present invention has been described in detail, those skilled in the art should understand that they can make various changes, substitutions and alterations herein without departing from the spirit and scope of the invention in its broadest form.

What is claimed is:

1. A line driver couplable to a transmission path having line characteristics associated therewith, comprising:
    a driver stage configured to send a signal along said transmission path, said driver stage including:
        a first differential amplifier receiving a first differential signal on a first differential input pair, and
        a second differential amplifier, coupled to said first differential amplifier, receiving a second differential signal on a second differential input pair, said first and second differential signals corresponding to said signal; and
    a switching network, coupled to said first and second differential amplifiers, configured to adaptively select a voltage level to apply across said first and second differential amplifiers to provide a power level to send said signal as a function of said line characteristics of said transmission path.

2. The line driver as recited in claim 1 wherein said voltage level is applied across each of said first and second differential amplifiers.

3. The line driver as recited in claim 2 wherein said driver stage comprises a reference circuit configured to provide a reference level associated with said first and second differential amplifiers, said reference circuit coupled between positive and negative power supply terminals of said first and second differential amplifiers.

4. The line driver as recited in claim 1 wherein said switching network comprises a plurality of switches configured to adaptively select said voltage level.

5. The line driver as recited in claim 4 wherein said switching network includes a positive rail switch connecting either a first supply voltage or a ground voltage to a positive power supply terminal of said first and second differential amplifiers.

6. The line driver as recited in claim 5 wherein said switching network further includes a negative rail switch connecting either a second supply voltage or a ground voltage to a negative power supply terminal of said first and second differential amplifiers.

7. The line driver as recited in claim 1 wherein said switching network comprises a plurality of switches configured to couple an output of said line driver to ground.

8. A method of operating a line driver coupled to a transmission path having line characteristics associated therewith, comprising:
    sending a signal along said transmission path; and
    adaptively selecting a voltage level to apply across a driver stage of said line driver to provide a power level for sending said signal as a function of said line characteristics of said transmission path, said driver stage including:
        a first differential amplifier receiving a first differential signal on a first differential input pair, and
        a second differential amplifier, coupled to said first differential amplifier, receiving a second differential signal on a second differential input pair, said first and second differential signals corresponding to said signal.

9. The method as recited in claim 8 further comprising applying said voltage level across each of said first and second differential amplifiers.

10. The method as recited in claim 9 wherein said sending further comprises providing a reference level associated with said first and second differential amplifiers, said providing including determining said reference level by coupling a reference circuit between positive and negative power supply terminals of said first and second differential amplifiers.

11. The method as recited in claim 8 wherein said adaptively selecting is performed by a switching network comprising a plurality of switches.

12. The method as recited in claim 11 wherein said switching network includes a positive rail switch connecting either a first supply voltage or a ground voltage to a positive power supply terminal of said first and second differential amplifiers.

13. The method as recited in claim 12 wherein said switching network further includes a negative rail switch connecting either a second supply voltage or a ground voltage to a negative power supply terminal of said first and second differential amplifiers.

14. The method as recited in claim 8 wherein said adaptively selecting further comprises coupling an output of said line driver to ground.

15. A transceiver coupled to a transmission path having line characteristics associated therewith, comprising:
   a conversion stage that converts signals between an analog and digital domain;
   a filter stage, coupled to said conversion stage, that filters said signals; and
   a line driver, including:
      a driver stage configured to send a signal along said transmission path, said driver stage including:
         a first differential amplifier receiving a first differential signal on a first differential input pair, and
         a second differential amplifier receiving a second differential signal on a second differential input pair, said first and second differential signals corresponding to said signal; and
      a switching network, coupled to said first and second differential amplifiers, configured to adaptively select a voltage level to apply across said first and second differential amplifiers to provide a power level to send said signal as a function of said line characteristics of said transmission path.

16. The transceiver as recited in claim 15 wherein said voltage level is applied across each of said first and second differential amplifiers.

17. The transceiver as recited in claim 16 wherein said driver stage comprises a reference circuit configured to provide a reference level associated with said first and second differential amplifiers, said reference circuit coupled between positive and negative power supply terminals of said first and second differential amplifiers.

18. The transceiver as recited in claim 15 wherein said switching network comprises a plurality of switches configured to adaptively select said voltage level.

19. The transceiver as recited in claim 18 wherein said switching network includes:
   a positive rail switch connecting either a first supply voltage or ground voltage to a positive power supply terminal of said first and second differential amplifiers, and
   a negative rail switch connecting either a second power supply voltage or a ground voltage to a negative power supply terminal of said first and second differential amplifiers.

20. The transceiver as recited in claim 15 wherein said switching network comprises a plurality of switches configured to couple an output of said line driver to ground.

* * * * *